July 5, 1960   J. M. HERBERT   2,944,204
CHARGING DEVICE FOR ELECTROMETERS
Filed April 26, 1957
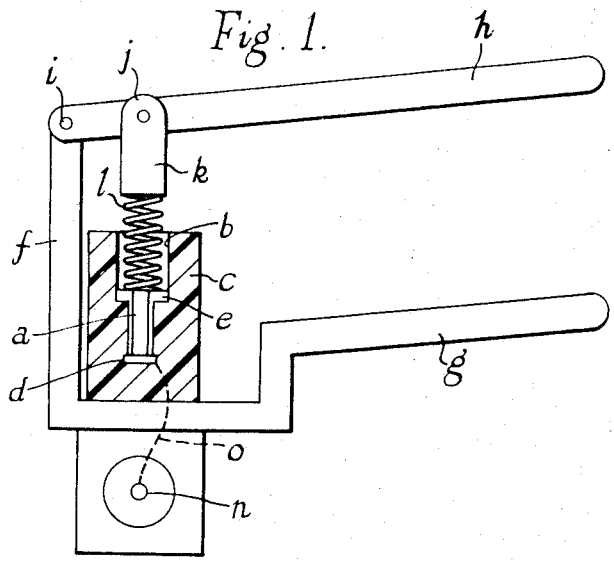
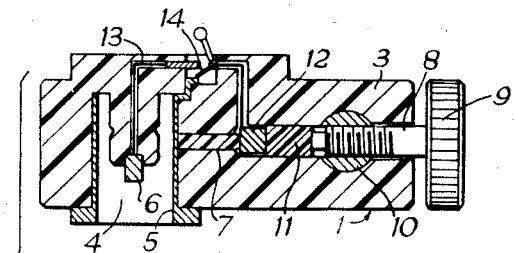
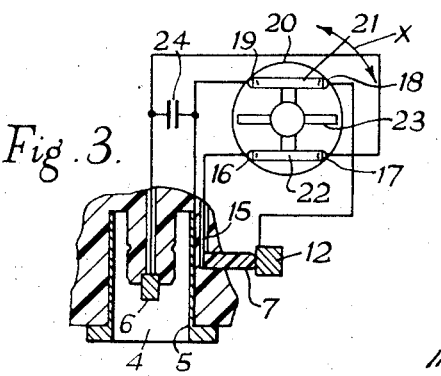
INVENTOR
JOHN MARTIN HERBERT.
BY
William E. P. Bayly
ATTORNEY

United States Patent Office 2,944,204
Patented July 5, 1960

2,944,204

CHARGING DEVICE FOR ELECTROMETERS

John M. Herbert, Horton, England, assignor to The Plessey Company Limited, Ilford, England, a British company Filed Apr. 26, 1957, Ser. No. 655,443

Claims priority, application Great Britain Apr. 12, 1957

3 Claims. (Cl. 320—1)

When electrometers are used for ionisation measurements, for example for measuring the ionising effect of X-ray radiation or other ionising radiation, the measurement requires the application of a predetermined electrostatic charge to the electrometer. The present invention has for an object to provide a convenient charging device suitable for this purpose.

According to the invention the device comprises a piezo-electric element means for applying a predetermined mechanical stress to said element to produce a potential difference between two points of the element, and connector electrodes for applying said potential difference to an electrometer.

The stress may be applied to the element through the medium of a spring member, thereby allowing the pressure applied to be conveniently regulated by the amount of movement of, for example, a hand lever mechanism or other manually operable mechanism by which the element is compressed.

According to a feature of the invention a switch may be incorporated in the device which permits to only apply the potential difference between the points of the element to the dosimeter-changing electrodes when a stress is applied to the element, and to short-circuit the element after disconnecting it from the dosimeter electrodes when the stress is removed. This is particularly desirable when several applications of pressure are required to produce the full amount of the desired charge of the electrometer.

According to yet another feature of the invention the number of stress applications required in this case may be reduced by the provision of a switch arrangement which permits the potential difference created when releasing the stress to be utilised as well as the potential difference created when the stress is being applied. In this case, according to the said further feature of the invention, a switch device is incorporated in the charging device which permits to disconnect the element from the charging electrodes and short circuit the element before each application and before each release of the stress, and which also permits the connections between the two points of the element and the electrometer-charging electrodes to be reversed at each transition from application to release of stress and vice versa.

Finally a low-leakage capacitor having several times the capacitance of the element may be connected in parallel to the electrometer-charging electrodes, in order to reduce leakage losses.

One specific embodiment is illustrated schematically in the Figure 1 of the accompanying drawing and is particularly intended for use with quartz-fibre electrometers.

In the accompanying drawing:

Figure 2 is a sectional elevation of another form of electrometer charger incorporating the invention and shows one form of contact device for disconnecting the element from the charging electrodes and then short-circuiting the same before a further application of stress.

Figure 3 indicates somewhat diagrammatically certain modifications of this embodiment.

Referring now first to Figure 1, a piezo-electric element *a* is held in a bore or recess *b* of an insulating block *c* between two electrodes *d* and *e*. The block *b* is fixed on a holder *f* provided with a projecting handle arm *g*, while a second handle arm *h* is pivoted at *i* to the body *f* to produce a tong-like assembly. Pivoted to the arm *h* at a point *j*, opposite to the element *a*, is a thrust link *k*, while a compression spring *l* is interposed between the link *k* and the electrode *e* at the outer end of the element *a*. The holder *f* is provided with a connector *m*, which constitutes a charging head, into which an electrometer can be inserted in order to be charged. The body of the charging head is connected to the electrode *e* through the spring *l*, link *k* and arm *h*, while a central terminal *n* is connected to the other electrode *d* through insulated conductor *o*.

In order to charge, for example, a quartz-fibre electrometer, the same is inserted into the charging head, whereby the piezo-electric element is connected between the quartz fibre and the electrometer case. The arms *g* and *h* are then moved towards each other by hand pressure, until due to the piezo-electric voltage produced the electrometer assumes the desired position. Due to the interposition of the sprng *l*, the voltage range normally required covers an appreciable angle of relative movement of the two arms *g* and *h*, whereby accurate charging is facilitated. The element may consist of barium titanate.

Referring now to the embodiment of Figure 2, the charging device itself is indicated generally by reference 1, while reference 2 indicates an electrometer-type dosimeter adapted to be charged by the device 1. The charging device itself comprises a block 3 of suitable insulating material, for example of methyl methacrylate plastic, provided with a charging socket 4 equipped with a sleeve-type contact 5 and a centre contact 6. A piezoelectric element 7, for example a cylindrical element of barium titanate piezoelectric material, is accommodated in a bore of the plastic block 3, with one end of the element 7 resting against and in electrical contact with the socket sleeve 5. The means for applying stress to the piezo-electric element comprise a screw 8 having a finger knob or control wheel 9 which co-operates with a nut 10. This nut may, for example, have the form of a length of circular-section rod material extending transversely to the axis of the element 7, with the screw-threaded bore accommodating the screw 8 extending at right-angles to the axis of the rod 10. The pressure exerted by the screw 8 is applied to the piezoelectric element 7 through the medium of a buffer member 11 of resilient insulating material, which may preferably be a block of self-lubricating elastomer such as nylon, and a metal contact block 12 which is interposed between the member 11 and the element 7, and which is connected to the centre contact 6 of the socket 4 by a flexible wire 13 extending through a suitable bore in the insulating block 3. The sleeve contact 5 is conveniently earthed.

In order to charge an electrometer 2, the same is plugged into the socket 4 when the element 7 is in its unstressed state. The control wheel 9 is then operated by being turned a predetermined number of turns. Due to the resilience of the buffer member 12, this will produce a predetermined stress in the element 7 resulting in a predetermined charge being applied to the dosimeter 2. The dosimeter is then removed from the socket 4, before the stress is released again and the element discharged. In order to avoid the necessity of having to remove the dosimeter from the socket before the stress is released, more particularly when several applications of stress are required to obtain the desired charge, a switch device 14 is preferably incorporated in the charging device. In the illustrated position the switch device disconnects the metal contact 12 from the centre electrode 6 of the charging socket 4. When the element 7 is in its unstressed condition before a charging operation, the switch 14 is operated to its other position, in which the short circuit of the element 7 is removed and the metal contact 12 is connected by the wire 13 to the centre contact 6 of the charging socket. If now the predetermined stress is applied to the piezoelectric element 7, the charge is applied to the dosimeter 2. The switch is then restored to the illustrated position to allow the stress to be removed without discharging the dosimeter, while at the same time short-circuiting the piezoelectric element 7. A further charge may then be applied by operating the switch 14 again as before, and then once more operating the control wheel 9 to apply once more a stress upon the element 7.

Figure 3 illustrates schematically a modified switch arrangement which allows the utilization not only of the potential difference created when applying the stress to the element 7 but also of the reverse potential difference developed when the stress is released. For this purpose an auxiliary contact 15, insulated from the sleeve 5, is provided for co-operation with the end of the element 7 opposite to the contact 12, and this contact 15, the lead 13 from the centre contact 6 of the socket 4, the contact 12, and the socket sleeve 5 are applied to contacts 16, 17, 18 and 19 respectively of a switch device 20 the movable part of which comprises two contact members 21 and 22, which in the illustrated position respectively connect contacts 16 and 17 and contacts 18 and 19, and a further contact member 23 which is arranged halfway between the contact members 21 and 22 and extends parallel to the latter. In the illustrated position accordingly contact member 23 does not interconnect any of the stationary contacts of the switch. The movable contact arrangement is rotatable from the illustrated position by 90° as indicated by the arrow X, and it will be seen that the connection between contacts 15 and 12 on the one hand and 5 and 6 on the other hand is reversed if the movable contact members of the switch 20 are jointly rotated by 90° from the illustrated position. It will further be noticed that, during the transition from one end position to the other, a central position will be passed, in which the contact member 23 short-circuits the piezoelectric element 7 by connecting contacts 16 and 18 to each other.

Assuming the device as illustrated in Figure 3 to be incorporated in a charger otherwise corresponding to Figure 2, and that the switch 20 has been moved to the illustrated position after operation of the control wheel 9 to compress the element 7, it will be seen that if the control wheel 9 is now operated in the opposite direction to release the stress on the element 7, the potential difference created between the ends of the element 7, which is of the operative direction to that produced when the stress is applied, will be applied to the electrometer with the same polarity at which the potential difference produced by the application of this stress has been applied in the arrangement according to Figure 2, because when the switch 20 is in the illustrated position, the contact block 12 is connected to the sleeve 5 and the other end contact 15 of the element 7 is connected to the centre contact 6 of the socket 4. When the release of stress has been completed, the switch 20 is reversed, before stress is applied again. In doing so, the switch passes a position at which the element 7 is short circuited, while the contacts 5 and 6 are isolated from the element. The charge produced by the compression of element 7 after reversal of the switch will therefore be added to the charge previously applied to the potentiometer.

In each case the dimensions of the piece of barium titanate (or other piezoelectric material) used are governed by two equations $$V_p/t = gF/A$$
$$C_p = AE/28.7t$$

where $V_p$ is the voltage generated by the element in isolation,
$t$ the distance in inches, apart of the electrodes,
$A$ the area in square inches of the electrodes covering the faces of the element,
$F$ the applied force in lb. wt.,
$g$ the piezoelectric constant,
$C_p$ the capacity of the element in micromicrofarads,
$E$ the dielectric constant of the barium titanate.

A typical value of $g$ is 12.5 volt. inch/lb. wt. and of $E$, 1500.

If the element is used to charge a dosimeter of capacity $C_x$, the potential given to the dosimeter, $V_x$, will be $$V_x = V_p C_p / (C_x + C_p)$$

If $C_p$ can be neglected in comparison with $C_x$ and if the expression for $C_p$ in terms of the dielectric constant and dimensions is substituted, it is clear that $$V_x = gEF/28.7C_x$$

Thus, if $V_x$ is required to be 250 volt and $C_x = 2000$, $F$ must be 753 lb. wt.

In the case of repeated application of stress (Figure 2), the voltage, $V_n$, generated after $n$ applications of pressure or, in the case of Figure 3 after $n$ alternate applications and releases, respectively, of pressure, is given by $$1 - V_n/V_p = (C_x/(C_x + C_p))^n$$

or if $C_p$ is small compared with $C_x$ $$\log_e V_p/(V_p - V_n) = nC_p/C_x$$

The invention is not limited to a straight element stressed by longitudinal compression. For example a suitable piezo-electric structure which is stressed by bending may be substituted if desired, and features described in respect of one embodiment may be suitably applied to other embodiments of the invention.

What is claimed is:

1. A charging device for electrometers, comprising a piezoelectric element, manually operable means for mechanically stressing the piezoelectric element by a pre-intended amount to produce a voltage of accurately predetermined value between two points of the piezoelectric element, connector electrodes for applying this potential difference to the electrometer, a switch arrangement which permits the voltage created when releasing the stress from the element to be utilised for charging as well as the voltage produced on application of the stress and a resilient element interposed between the manually operable means and the piezoelectric element whereby a relatively great actuating movement of the manually operable means is required in order to produce a relatively small amount of change in the applied stress and in consequence the voltage arising from the application of the stress.

2. A charging device for electrometers, comprising a piezoelectric element, manually operable lever mechanism for mechanically stressing the piezoelectric element by a pre-intended amount to produce a voltage of accurately predetermined value between two points of the piezoelectric element, connector electrodes for applying this potential difference to the electrometer, a switch device for disconnecting the piezoelectric element electrically from at least one of the electrodes and for short circuiting the thus disconnected piezoelectric element, and a resilient element interposed between the manually operable lever mechanism and the piezoelectric element whereby a relatively great actuating movement of the manually operable lever mechanism is required in order to produce a relatively small amount of change in the applied stress and in consequence the voltage arising from the application of the stress.

3. A charging device for electrometers, comprising a piezoelectric element, manually operable screw means for mechanically stressing the piezoelectric element by a pre-intended amount to produce a voltage of accurately predetermined value between two points of the piezoelectric element, connector electrodes for applying this potential difference to the electrometer, a switch device for disconnecting the piezoelectric element electrically from and for reversing the connections between the piezoelectric element and the connector electrodes, and a resilient element interposed between the manually operable screw means and the piezoelectric element whereby a relatively great actuating movement of the manually operable screw means is required in order to produce a relatively small amount of change in the applied stress and in consequence the voltage arising from the application of the stress.

References Cited in the file of this patent

UNITED STATES PATENTS

| | | |
|---|---|---|
| 1,531,595 | Chaix | Mar. 31, 1925 |
| 2,044,000 | Heising | June 16, 1936 |
| 2,240,293 | Goddard | Apr. 29, 1941 |
| 2,676,273 | Oestreicher | Apr. 20, 1954 |
| 2,691,159 | Heibel | Oct. 5, 1954 |
| 2,717,589 | Harkness | Sept. 13, 1955 |
| 2,717,916 | Harkness | Sept. 13, 1955 |
| 2,759,138 | Andrews | Aug. 14, 1956 |
| 2,782,397 | Young | Feb. 19, 1957 |